July 14, 1942.　　　　B. WANDEL　　　　2,290,082
NON-REWIND EXPANSIBLE FILM REEL
Filed May 21, 1940
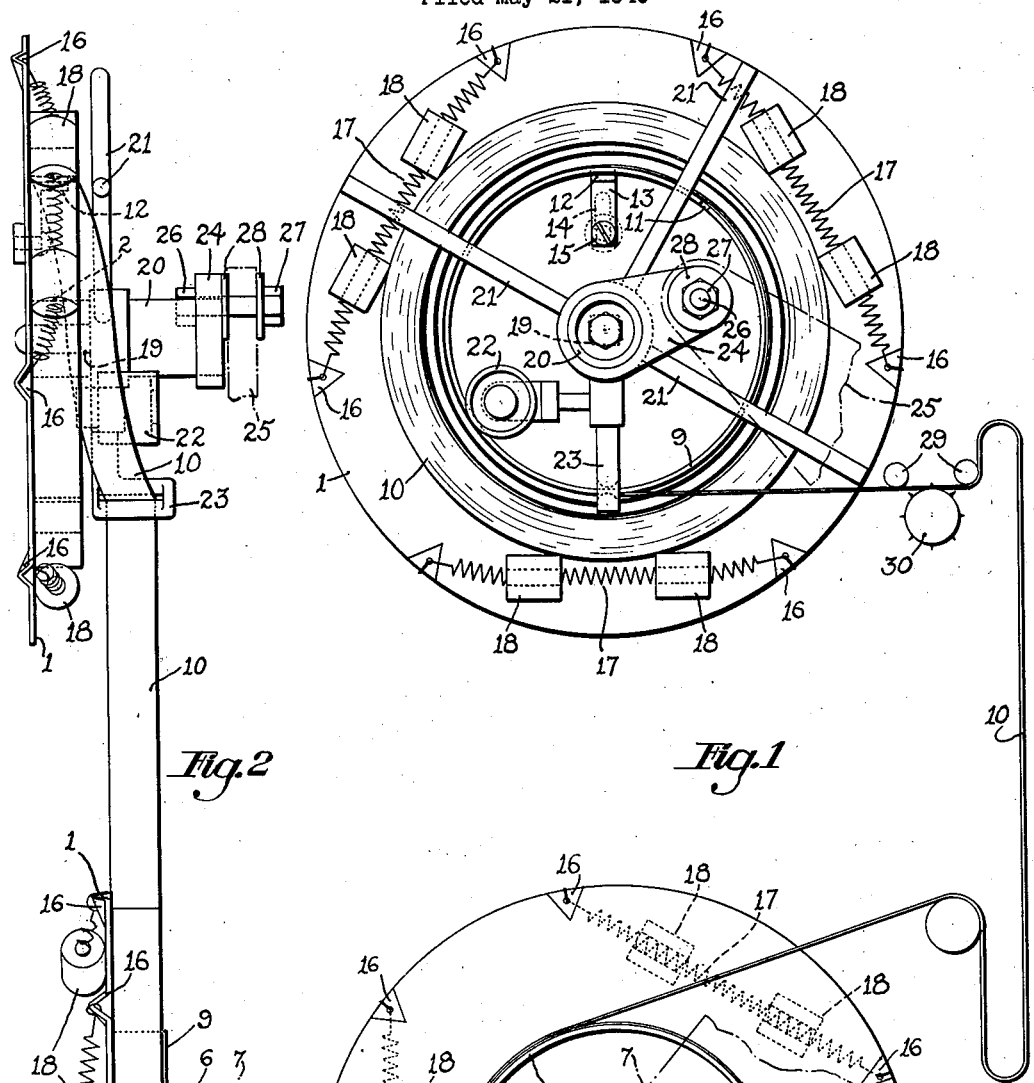
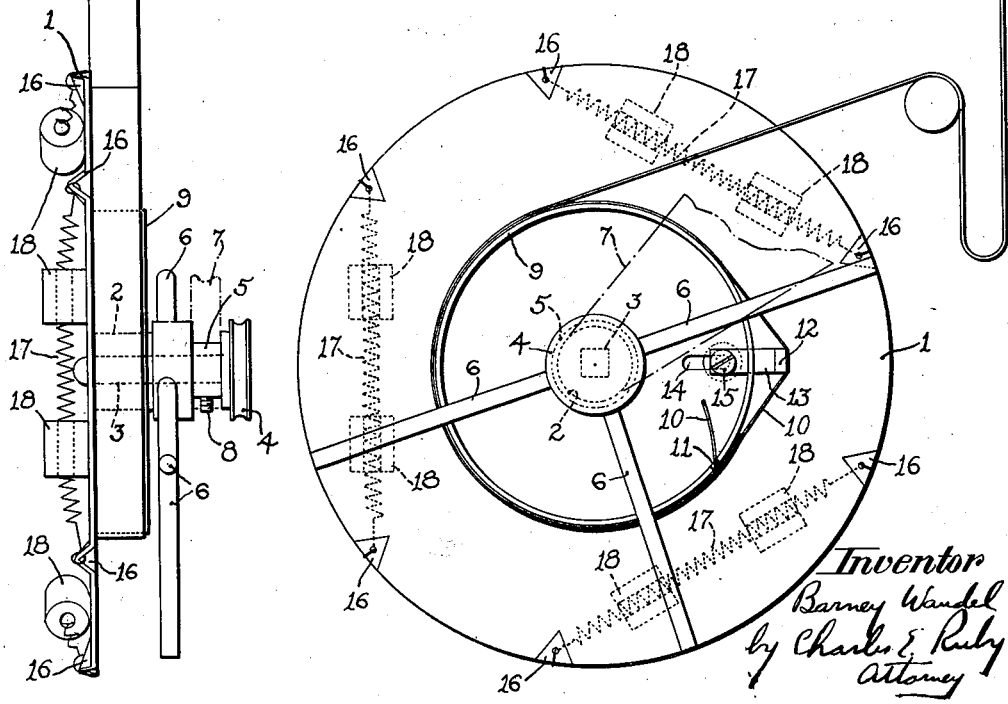
Inventor
Barney Wandel
by Charles E. Ruby
Attorney Patented July 14, 1942

2,290,082

UNITED STATES PATENT OFFICE 2,290,082

NONREWIND EXPANSIBLE FILM REEL

Barney Wandel, Boston, Mass., assignor to No Rewind Reel Corp., a corporation of Massachusetts Application May 21, 1940, Serial No. 336,373

5 Claims. (Cl. 88—18.7)

The present invention pertains generally to reels for motion picture projecting machines, more particularly to reels for motion picture projecting machines by the use of which the necessity of rewinding the film between successive showings thereof is obviated, and specifically to reels for motion picture projecting machines of the character described which are especially adapted for use in home projection apparatus.

As is well known in the art, the method presently employed in the showing of non-continuous films, i. e., films whose ends are not united to form continuous bands, consists of drawing the film from the reel upon which it has been wound, passing the film past the lens of the projector, and winding the film upon a second reel, the outer end of the film when on the feeding reel becoming the inner end of the film on the winding reel, thereby necessitating the rewinding of the film before the film can be shown in proper sequence a second time. This method of operation is unsatisfactory because of the time consumed in the rewinding operation and because of the wear and tear and the breakages of the film incurred in and by the double handling thereof.

The principal object of the present invention is to provide an improved reel for motion picture projecting machines upon which the film can be wound and from which the film can be fed in the succeeding showing of the film without rewinding the film upon another reel; or, expressed alternatively, the principal object of the present invention is to provide an improved reel for motion picture projecting machines upon which the film can be wound, with the starting end of the film becoming the inner end of the film upon the improved reel, and the finishing end of the film becoming the outer end of the film upon the improved reel, and from which the film can be fed in the succeeding showing, the starting, or inner, end of the film becoming the inner end of the film upon the second improved reel, and the finishing, or outer, end of the film becoming the outer end of the film upon the second improved reel.

Another object of the present invention is to provide an improved reel for motion picture projecting machines of the character described and devices accessory thereto facilitating the realization of the principal object of the present invention.

The attainment of these and other objects of the present invention and the advantages attendant upon the use of the present invention will become apparent when consideration is given to the following description thereof, together with the accompanying drawing thereof which forms a part of the specification, wherein Fig. 1 is a diagrammatic side elevation of a motion picture projecting machine showing side elevations of two of the improved reels, one in the feeding position and the other in the winding position, and the devices accessory to the improved reels to facilitate their operation, and Fig. 2 is a front elevation of the two improved reels in the mutual relation shown in Fig. 1, and of the devices accessory to the improved reels.

In Figs. 1 and 2, those portions of the motion picture projecting machine to which the present invention is secured and which form no portion of the present invention are shown in dot-and-dash lines.

In the drawing, 1 designates a circular plate to which is secured, at its center, a suitable hub 2: the plate 1 and the hub 2 are keyed for the reception of the axle 3 of the winding mechanism of the motion picture projecting machine and the idling axle 19 of the feeding mechanism of the motion picture projecting machine.

Substantially concentric with the hub 2 and secured to the plate 1 is the ring 9, which constitutes, in large measure, the film-receiving element upon which the film 10 is wound, which is in width slightly greater than is the width of the film 10, and which is adapted to receive and to retain the starting end of the film 10 by being provided with an incision 11 formed therein which substantially traverses the width of the ring 9. At one or more points on the periphery of the ring 9, there is removed therefrom a portion, in length, not necessarily but if desired, as great as is the width of the ring 9, but in all cases, substantially as great as is the width of the film 10 to be wound upon the ring 9. For these removed portions of the ring 9 are substituted the upright portions 12 of small angle pieces, the horizontal portions 13 of which are keyed to fit into, and to be movable in, the slots 14, radially disposed in the plate 1. By means of bolt-washer-locknut ensembles 15, the angle pieces may be adjusted to, and maintained in, desired positions relative to the slots 14, thereby providing an expansible film-receiving reel.

At a plurality of positions on the periphery of the plate 1, the plate 1 is provided with V-shaped indentations 16, which are pierced with centered holes. Secured in, and stretched between, holes in sequential indentations are the tensional springs 17, each bearing one or more rubber shields 18: the tensional springs 17 bearing the rubber shields 18 can be disposed upon either side of the plate 1.

When the improved reel is in the receiving position it is mounted upon the axle 3 of the driving mechanism of the motion picture projecting machine. The axle 3 carries also the driving pulley 4 and is rotatable in the ball-bearing containing casing 5, which carries the three-prong spider 6 and which is inset into the portion 7 of the motion picture projecting machine and retained therein by the set screw 8.

When the improved reel is in the feeding position, it is mounted upon the idling axle 19 rotatable in the ball-bearing containing casing 20 which carries the three-prong spider 21, the pulley 22 mounted on ball-bearings, and the film guide 23, and upon which is shrunk the arm 24 at one of its ends, while the other end of the arm 24 is secured to the portion 25 of the motion picture projecting machine by the bolt 26, the nut 27 and the washers 28, 28. It will be observed that the improved reel in the feeding position is not in alignment with the improved reel in the receiving position, but is parallel thereto and offset therefrom by an amount somewhat greater than the width of the film used in the motion picture projecting machine. The film 10 is shown as passing from the improved reel in the feeding position, over the pulley 22 through the film guide 23, between the rollers 29 and film-feeding sprocket 30, to become wound upon the improved reel in the receiving position.

The use of, and the results realizable by the use of, the improved reel can best be appreciated by recountnig the procedure of winding the film upon the improved reel in the receiving position, transferring from the receiving position to the feeding position the improved reel carrying the film wound thereupon, and feeding the film from the improved reel while it is in the feeding position. In pursuance of this plan, the following steps are taken: the empty improved reel is installed in the receiving position, the angle pieces (but one is shown in the drawing of the improved reel) are advanced outwardly, so that the outer surfaces of their upright portions 12 are at greater distances from the center of the plate 1 than are the elements of the outer surface of the ring 9, and the tensional springs 17, bearing their rubber shields 18, are disposed upon the rear face of the plate 1. The starting end of the film 10 is then threaded into the incision 11 in the ring 9 and the driving mechanism of the motion picture projecting machine is then actuated, whereupon the film 10 is wound upon the ring 9 and the upright portions 12 of the outwardly advanced angle pieces of the improved reel in the receiving position, forming a distorted spiral, all of the loops of which are in length substantially greater than is the circumference of the ring 9. When the film 10 has been completely wound onto the improved reel in the receiving position, the tensional springs 17, bearing their rubber shields 18, are then snapped over the periphery of the plate 1, and the rubber shields 18 are allowed to make contact with the outer layer of the film 10 wound upon the improved reel, and to exert upon the spiral of wound film 10 slight radially directed pressures resulting from the displacements of the tensional springs 17 from straight-line dispositions between holes in successive V-shaped indentations 16 at the periphery of the plate 1. The improved reel, carrying the spiral of wound film 10 retained between the ring 9 and upright portions 12 of outwardly advanced angle pieces and the tensional springs 17, bearing their rubber shields contacting the outer layer of the spiral of wound film 10, is then installed in the feeding position of the moving picture projecting machine: the positions of the tensional springs 17 and their rubber shields 18 and the engagement of the rubber shields 18 with the outer layer of the spiral of wound film 10 are shown in the upper portion of Fig. 1. If now the angle pieces of the improved reel are retracted inwardly, the spiral of wound film 10 floats, being held disposed substantially concentrically about the ring 9 by the tensional springs 17 and their rubber shields 18. The inner, or starting, end of the film 10 is removed from the incision 11 in the ring 9, is passed over the pulley 22, is threaded through the film guide 23, is inserted between the rollers 29 and the film-feeding sprocket 30, is passed through the film-gate (not shown) and past the lens of the motion picture projecting machine, and is finally threaded into the incision 11 of the ring 9 of an improved reel in the receiving position, of which the angle pieces have been advanced outwardly, and the tensional springs 17, bearing their rubber shields 18, have been disposed upon the rear face of the plate 1. Now, as the driving mechanism of the motion picture projecting machine winds the film 10 upon the improved reel in the receiving position, the film 10 feeds smoothly from the inner portion of the floating wound spiral of film. Throughout the feeding of the film 10, never more than two turns of the film become sensibly detached from the body of the floating wound spiral of film, and these two turns of the film tend to hug the outer surface of the ring 9 of the improved reel in the feeding position, thereby providing sufficient frictional engagement with the ring 9 to rotate, at the proper speed, the improved reel from which the film is being fed. Emphasis is to be accorded to the statement, based upon repeated observations, that, at no time during the feeding of the film 10 from the inner portion of the floating wound spiral of film does the wound spiral of film collapse, nor does the wound spiral of film tend to become unwound. It is conceivable that the results realizable by the use of the improved reel might be less desirable were the radius of the ring 9 quite small, or were the moment of inertia of the improved reel quite large, but, with the use of rings 9 of moderate diameters, and with the use, for the construction of the improved reels, of materials as light as, or lighter than, the materials usually employed in the construction of reels for motion picture projecting machines, the results realized by the use of the improved reels have been eminently satisfactory.

The purposes of the devices accessory to the improved reels proper are obvious: the film 10, issuing from the inner portion of the floating wound spiral of film, must needs be fed to an improved reel offset with respect to the improved reel carrying the floating wound spiral of film; and this feeding, involving as it does a corresponding offsetting of the film 10, is accomplished by the use of the pulley 22 and the film guide 23: the two spiders 21 and 6 insure at all times the correct guidance of the film 10 with respect to the improved reels. Thus has been provided an improved reel for motion picture projecting machines by the use of which the necessity of rewinding the film between successive showings thereof has been obviated.

It is obvious that many modifications in the construction of the improved non-rewind reel and in the constructions of the devices accessory to the improved non-rewind reel proper can be effected without departing from the spirit and the scope of the present invention. In particular, it is obvious that expansibility of the film-receiving element of the improved non-rewind reel can be realized by the use of many forms of construction other than the simple form of construction disclosed, and that pressures directed radially upon the wound spiral of film to float it substantially concentrically with the ring 9 can be realized by the use of means other than the tensional springs 17, bearing their rubber shields 18. Also, for the pulley 22 mounted on ball-bearings and for the film guide 23 may be substituted a plurality of film guides provided with rollers mounted on ball-bearings, or any other equivalents of such forms of construction. But whatever forms of construction that may be used in substitution for the forms of construction disclosed, the present invention is to be limited only by the scope of the appended claims.

Having thus described my invention, I claim:

1. A reel for motion picture projecting machines comprising a plate provided with a keyed hub, a cylindrical ring secured to the plate and concentric with the keyed hub, a section of the cylindrical ring displaceable outwardly and maintainable fixedly with respect to the cylindrical ring, means for securing an end of a film to the cylindrical ring, and means secured to the plate for exerting upon a spiral of film wound upon the cylindrical ring and outwardly displaced section thereof forces directed radially and inwardly with respect to the wound spiral of film.

2. In combination with a reel for motion picture projecting machines comprising a plate provided with a keyed hub, a cylindrical ring secured to the plate and concentric with the keyed hub, a section of the cylindrical ring displaceable outwardly and maintainable fixedly with respect to the cylindrical ring, means for securing an end of a film to the cylindrical ring, and means secured to the plate for exerting upon a spiral of film wound upon the cylindrical ring and outwardly displaced section thereof forces directed radially and inwardly with respect to the wound spiral of film, means for offsetting and guiding the film when drawn from the inner portion of the spiral of film wound upon the cylindrical ring and outwardly displaced section thereof.

3. In combination with a reel for motion picture projecting machines comprising a plate provided with a keyed hub, an expansible film-receiving element secured to the plate, means for securing an end of a film to the expansible film-receiving element, and a plurality of tensional springs provided with rubber shields and secured to the plate at points on its periphery, a pulley, a spider and a film guide, mounted in fixed relation to one another and to the axis of rotation of the reel and in planes parallel to the reel, for offsetting and guiding the film when and as it is drawn from the inner portion of the spiral of film wound upon the expansible film-receiving element secured to the plate.

4. In combination with a reel for motion picture projecting machines comprising a plate provided with a keyed hub, a cylindrical ring secured to the plate and concentric with the keyed hub, a section of the cylindrical ring displaceable outwardly and maintainable fixedly with respect to the cylindrical ring, means for securing an end of a film to the cylindrical ring, and means secured to the plate for exerting upon a spiral of film wound upon the cylindrical ring and outwardly displaced section thereof forces directed radially and inwardly with respect to the wound spiral of film, a pulley, a spider and a film guide, mounted in fixed relation to one another and to the axis of rotation of the reel and in planes parallel to the reel, for offsetting and guiding the film when and as it is drawn from the inner portion of the spiral of film wound upon the cylindrical ring and outwardly displaced section thereof.

5. In combination with a reel for motion picture projecting machines comprising a plate provided with a keyed hub, a cylindrical ring secured to the plate and concentric with the keyed hub, a section of the cylindrical ring displaceable outwardly and maintainable fixedly with respect to the cylindrical ring, means for securing an end of a film to the cylindrical ring, and a plurality of tensional springs provided with rubber shields and secured to the plate at points on its periphery, a pulley, a spider and a film guide, mounted in fixed relation to one another and to the axis of rotation of the reel and in planes parallel to the reel, for off-setting and guiding the film when and as it is drawn from the inner portion of the spiral of film wound upon the cylindrical ring and outwardly displaced section thereof.

BARNEY WANDEL.